United States Patent [19]

Nitta

[11] Patent Number: 5,347,306
[45] Date of Patent: Sep. 13, 1994

[54] ANIMATED ELECTRONIC MEETING PLACE

[75] Inventor: Tohei Nitta, Newton, Mass.

[73] Assignee: Mitsubishi Electric Research Laboratories, Inc., Cambridge, Mass.

[21] Appl. No.: 169,163

[22] Filed: Dec. 17, 1993

[51] Int. Cl.⁵ .................. H04N 7/12; H04M 11/00
[52] U.S. Cl. .................... 348/15; 345/122; 348/578; 395/152; 395/154
[58] Field of Search .................. 348/14–16, 348/19, 26, 61, 577, 578, 699, 700, 707; 379/93, 96–99, 90, 110, 202; 395/152–154, 100, 118–200; 434/112; 345/138, 122

[56] References Cited

U.S. PATENT DOCUMENTS

| 4,189,744 | 2/1980 | Stern | 348/577 |
| 4,371,893 | 2/1983 | Rabeisen | 348/707 |
| 4,546,383 | 10/1985 | Abramatic et al. | 348/19 |
| 4,600,919 | 7/1986 | Stern | 345/138 |
| 4,878,843 | 11/1989 | Kuch | 434/112 |
| 5,103,488 | 4/1992 | Gemello et al. | 348/26 |

FOREIGN PATENT DOCUMENTS

| 0572257 | 12/1993 | European Pat. Off. . |
| 62-42688 | 2/1987 | Japan . |
| 62-154988 | 7/1987 | Japan . |
| 62-157491 | 7/1987 | Japan . |
| 62-199184 | 9/1987 | Japan . |
| 62-199187 | 9/1987 | Japan . |
| 62-199189 | 9/1987 | Japan . |
| 62-226782 | 10/1987 | Japan . |
| 1-220588 | 9/1989 | Japan . |
| 1-220589 | 9/1989 | Japan . |
| 2-58486 | 2/1990 | Japan . |
| 4-126486 | 4/1992 | Japan . |
| 4-132387 | 5/1992 | Japan . |

Primary Examiner—Wing F. Chan
Attorney, Agent, or Firm—Robert K. Tendler

[57] ABSTRACT

A network-based animated electronic meeting place is provided for business meetings, education, simulated classrooms, casual encounters, personal meetings, art auctions, parties and game playing, which includes a terminal for each participant on the network and local prestored animation graphics, with simulated participants in the form of animated characters or dolls being driven through sensing of each of the participants at their respective work stations, including their position, posture, gestures, audio content and optionally that persona which each individual wishes to be displayed at the animated electronic meeting place. In one embodiment, a user chooses how he represents himself on the screen through the use of a Persona or Character control. The animated electronic meeting place is provided with real time 3-D graphics renderings, showing the meeting with all of the participants including the individual participant as himself, a microphone to capture the user's speech, digital sound processing for voice localization, and position sensors to detect the participant's gestures and/or facial expressions as well as body movement. In one embodiment, the user is also provided with a view control in the form of a joy stick to zoom in or alter the perspective at which he is viewing the animated meeting. In a further embodiment, through sound localization detection as well as speech recognition circuits, stereo sound at each terminal can be steered so as to localize the sound to the person who is detected as talking.

15 Claims, 3 Drawing Sheets

ANIMATED ELECTRONIC MEETING PLACE

FIELD OF INVENTION

This invention relates to an electronic meeting place and more particularly to a meeting place in which animated characters are utilized to represent participants.

BACKGROUND OF THE INVENTION

Various video conferencing techniques have been utilized in the past to provide full frame video of participants for the video conference, most usually with each of the participants represented at a window on the terminal or display device utilized. What all of the prior video conference systems have in common is that it is necessary to provide full frame video which is bandwidth intensive and, inter alia, does not permit the participants to alter their image which is displayed to other participants. One such video conferencing system by K. Hiratsuka and H. Kakihara entitled Video Conferencing System Japan Telecommunications Review, Vol. 18, No. 3, pp. 145-151, July 1976, utilizes full frame video and accommodates large numbers of conferees by dividing up each scene into different segments with each segment filmed by different cameras. The purpose of dividing up the scene into segments is to be able to portray conferees large enough to be recognized, noting that if all the conferees were pictured, the faces would be too small to be recognized. A similar system is illustrated in U.S. Pat. No. 3,601,530 issued to Robert C. Edson et al., illustrating a video conferencing system using voice switched cameras, with the cameras dividing up the scene. Note that a video conferencing system corresponding to the aforementioned Japanese system is also published in the Proceedings of the IEEE, Vol. 73, No. 4, April 1985, authored by Hakar Sabri and Birendra Prasada.

As illustrated in U.S. Pat. No. 4,004,084 issued to Earl Franklin Brown et al., a video conferencing system utilizes spatial reduction and temporal resolution to minimize bandwidth requirements for full-frame video utilizing speech to select which picture is automatically transmitted. Here only one picture is displayed at a time.

British Patent 1,173,918 illustrates the utilization of a TV screen to present full frame video corresponding to the various participants in separate parts of the TV screen.

As illustrated in U.S. Pat. No. 5,157,491, modular screen approaches have been utilized in video teleconferencing, again to provide a full likeness of the individual at various modules. Additionally, U.S. Pat. No. 4,965,819 to Dino Kannes describes a video conferencing system for courtroom applications in which full-framed video likenesses of participants are presented at various portions of the screen.

Of particular interest is U.S. Pat. No. 4,400,724 which illustrates a virtual space teleconferencing system by Craig L. Fields, in which video cameras are networked in which images of conferees are displayed at corresponding positions. Positions of the conferees are detected by an overhead video camera and the image signals are combined for display on the screens on tabletops at each station. Images from a video storage device are also combined in the composite signal. The display devices and cameras at each station are oriented with respect to the virtual conference space such that the images from each station will appear on the screen as oriented the same as the conferee at that station.

In order to limit bandwidth and direct attention to a participant who is speaking, a speaking participant in the conference is isolated and filmed in one system described in U.S. Pat. No. 5,206,721 through the use of a swiveled camera pointed at the speaking participant. A like directed patent is U.S. Pat. No. 4,996,592 in which the field of view of video framing is electronically adjusted to isolate the speaking participant.

Other U.S. Patents relating to video conferencing include U.S. Pat. Nos. 5,195,086; 5,187,571; 5,061,992; 5,027,198; 5,003,532; 4,995,071; 4,935,953; 4,931,872; 4,890,314; 4,882,743; 4,710,917; 4,650,929; 4,574,374; 4,529,840; 4,516,156; 4/054,906; 3,775,563 and 3,725,587. Also related is U.K. Patent Application No. 2,238,681 dated May 6, 1991.

What will be appreciated from the above is that video conferencing has relied on full frame video to represent the participants.

The problem with transmitting video, especially in network applications, is the large bandwidth required. Moreover, information contained in the full frame video is not necessarily that which each participant wishes to have on view to other participants. Additionally, full-frame video includes information extraneous to a meeting or game playing situation, which may be totally irrelevant to the purpose of the meeting or game. In fact, full frame video representations of an individual may be distracting and therefore unwanted. Disinterest or facial or hand gestures which an individual would not want represented to other participants are nonetheless transmitted without any control on the part of the participant. Thus it is not possible for the participant to control his persona, ie., his presentation of himself to other participants on the network. Moreover, there are no means for augmenting one's persona in any given direction should a participant want to be more emphatic than a straight filming of his actions would indicate. Likewise, if a participant is bored, but does not want to show it, there is no ready means for him to control that which is presented to the other participants.

In terms of the participant viewing his terminal, heretofore the person viewing the terminal and thus the conference was not included in the scene. Thus he could not view himself as he participated in the conference so that he could analyze his gestures or demeanor and adjust them if desired. Seeing one's self as portrayed to others is of course important if one has the opportunity to control what other participants see.

Also, in prior teleconferencing systems, there has been no ability for the individual to maneuver around the space presented to him on the terminal. Nor has there been a stereo spatial localization technique utilized to steer the apparent direction of the audio to the location of the speaking participant. Although attempts have been made to zoom in or focus in on a speaking individual by detecting a mike output, audio spatial location has not been utilized in video conferencing techniques.

However, the most important lack of all video conferencing techniques is the supposed requirement to send a complete likeness of the individual participant to other conferees or participants. This requires exceedingly high bandwidth, exceeding twisted pair capability, and in some instances exceeding even fiber optic capability to provide real time representations of the conference.

SUMMARY OF THE INVENTION

In order to solve the above problems with video conferencing and bandwidth, a network-based animated electronic meeting place is provided for business meetings, education, simulated classrooms, casual encounters, personal meetings, art auctions, parties and game playing, which includes a terminal for each participant on the network and local storage of the images or graphics required for the animation, with simulated participants in the form of animated characters or dolls being driven through sensing of each of the participants at their respective work stations, including their position, posture, gestures, audio content and optionally that persona which each individual wishes to be displayed at the animated electronic meeting place.

In one embodiment, a user chooses how he represents himself on-screen through the use of a Persona or Character control, in which each user controls what about himself is presented at the animated electronic meeting place. Note that the Persona Control drives the animation graphics at each terminal to convey one's mood, or in general, to control the presentation of oneself to the animated electronic meeting place.

The animated electronic meeting place is provided with real time 3-D graphics renderings, showing the meeting with all of the participants including the individual participant as himself, a microphone to capture the user's speech, digital sound processing for voice localization, and position sensors to detect the participant's gestures and/or facial expressions as well as body movement. In one embodiment, the user is also provided with a view control in the form of a joy stick to zoom in or alter the perspective at which he is viewing the animated meeting. In a further embodiment, through sound localization detection as well as speech recognition circuits, stereo sound at each terminal can be steered so as to localize the sound to the person who is detected as talking.

The subject animated electronic meeting place permits each of the users to portray exactly what of himself or herself he desires, with the animation eliminating the high bandwidth prior art video conferencing techniques, while at the same time providing a degree of filtering so that extraneous matters not relevant to the meeting are excluded through the animation process. With the animation, users can communicate with motions such as gestures, facial expressions and direction of gaze as well as body movement, with sound localization providing for heightened realism and/or accentuation during the meeting process. Optionally, 3-D six degree of freedom detectors are utilized for real time tracking of the individual's movements and gestures, with gesture recognition not only providing input for driving the animation graphics but also providing for lip movement detection to determine which of the participants is speaking. The system may easily be implemented in a distributed form or centralized design, with the pre-stored graphics and images for the animation reducing video bandwidth below that associated with standard two-wire telephone lines.

In one embodiment, rather than utilizing dolls or other caricatures of the individuals, the individual's face can be superimposed over the head give a of the doll so as to three-dimensional picture of the participant. In a further embodiment, participants are displayed in a standard meeting setting, such as around a conference table, in which participants are located at positions around the conference table controlled by the participants, with corresponding poses being presented as each of the participants either speaks or moves. Note that the animated figures are made to move in accordance with sensed gestures of the participants.

In a preferred embodiment, no cameras or sensors are used to detect the participant's location or body position, but rather the participant controls his character through the use of a joy stick or a bank of switches so that he may be doing other things while the meeting is in progress, or so that he can mask his gestures and positions from general view.

The system thus provides teleconferencing without the necessity of providing full motion video and windows representing each of the participants which minimizes network bandwidth requirements.

BRIEF DESCRIPTION OF THE DRAWINGS

These and other features of the Subject Invention will be better understood in connection with the Detailed Description taken in conjunction with the Drawings of which.

DETAILED DESCRIPTION

Figure 1:
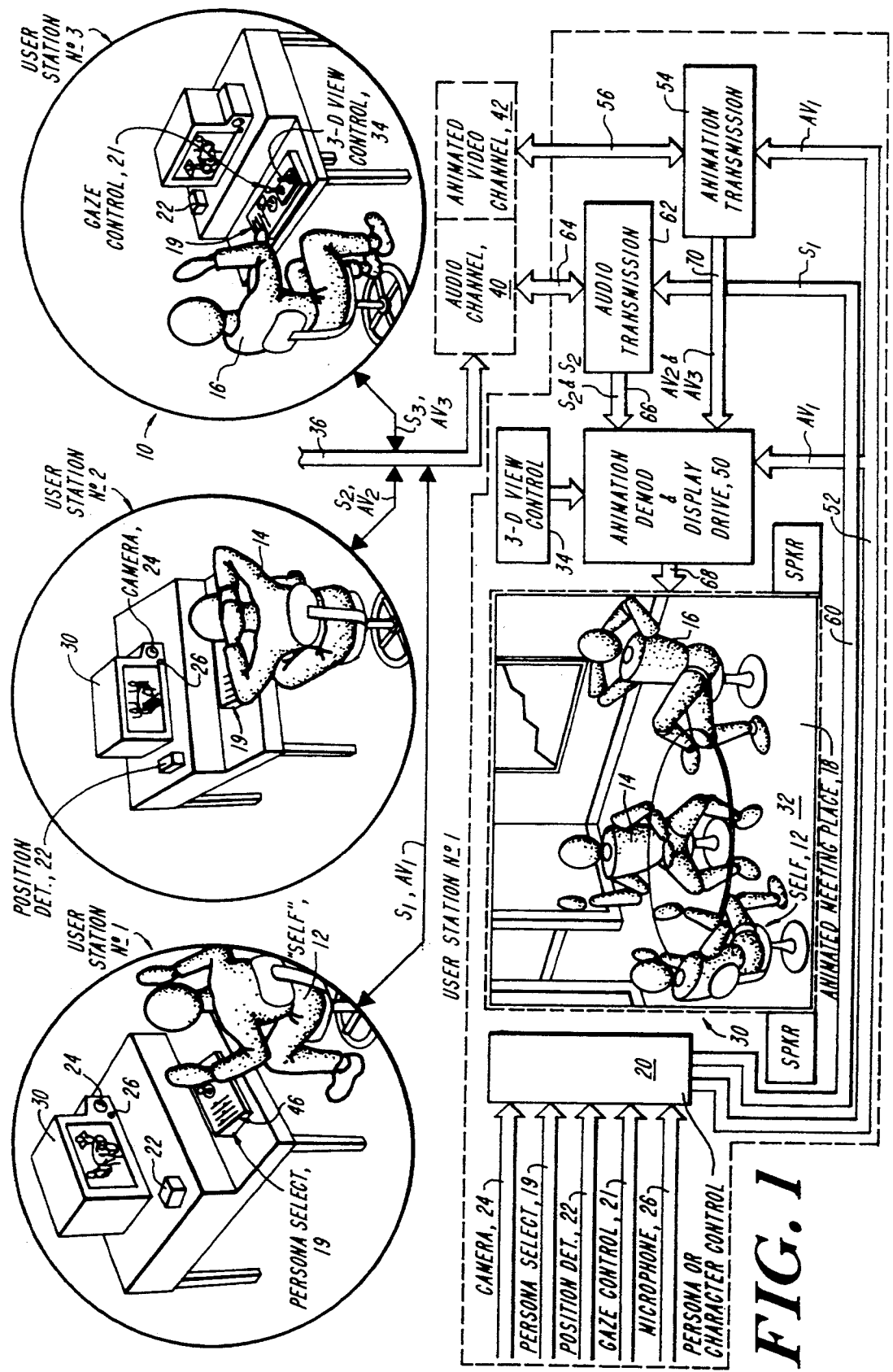
FIG. 1 is a diagrammatic illustration of the animated electronic meeting place illustrating the utilization of a number of terminals connected to a network, with each terminal providing a scene including the animated characters at specific locations about a meeting table, and with the utilization of a Persona or Character control unit, such that each of the participants can control that about himself which is portrayed to the others, with each individual user being portrayed on the screen along with the other users so that each user can view himself as portrayed to others.

Referring now to FIG. 1, an animated electronic meeting place 10 is provided in which users or participants 12, 14 and 16 are portrayed on a screen 18, with participants 12, 14 and 16 having poses generally corresponding to the poses sensed at each of the respective user stations, Station #1, Station #2 and Station #3. At each of the user stations is provided a persona select 19 coupled to a persona or character control unit 20, a position detection sensor 22, a camera 24 and a microphone 26, all of which are in the general vicinity of a terminal 30 which is utilized to display an image of the animated electronic meeting place such as shown by screen 32 to each of the users.

It will be appreciated that the animated electronic meeting place is 3-D in character in which each of the users is illustrated as a caricature, doll, or other representation of himself controlled by persona control 20. In addition, a 3-D view control 34 is provided which is utilized to zoom in and out of the scene or to view the scene from different perspectives or angles.

Note that the information to and from each station is coupled to a bus 36 which may contain both digital and analog information, with each station sending and receiving both sound and animated video control or command signals, respectively noted as S and AV, with the S relating to sound and AV relating to animated video.

The audio and video information corresponds to an audio channel 40 and an animated video channel 42 which in a distributed system runs between each station.

As can be seen, the Persona control unit 20 has a number of user operable inputs and inputs which sense the user at his terminal. Thus camera 24, Persona select 19, position detection sensor 22, gaze control 21 and microphone 26 are all inputs to the Personal control.

It is the purpose of the Persona control to be able to establish what the individual is in fact doing at his user station, and to be able to alter the image which is presented not only to himself at his own terminal but also to others at other terminals on the network. For instance, Persona select 19 may as illustrated incorporate a number of switches 46 which determine, for instance, what gestures that the particular character or individual will have at the animated electronic meeting place. If one's mood is somber, one can project a somber caricature simply by flipping that particular switch which will give the character a gloomy persona. What this means is that the attitude and the motions of the character representing the user will be slow and may include a bored-looking stance such as illustrated by character 16 in scene 32.

Likewise, if the user wishes to portray himself as being angry, his motions may be accelerated such that the animated character representing this particular user will seem to move very quickly and very animatedly. The other persona indications could be, for instance, rather than looking at the individual participants, the user could portray his head as looking out the window to indicate boredom or disgust. Thus as part of the Persona select and gaze control unit 21, a separate switch or joy stick may be utilized to control the gaze of the user as portrayed in the scene. This kind of control over one's persona or character is useful in that the user has complete control over what about himself or his attitudes is portrayed to others. As will be seen in connection with FIG. 3, a system can be devised which specifically avoids the use of user attitude sensing devices. The user thus can specify what his character does regardless of what he is really doing.

It will be appreciated that the Persona control unit at each user station has an audio and animated video control or command signal output which, in this embodiment, is applied to an animation demodulation and display drive unit 50, the purpose of which is to demodulate the animation commands or signals and drive an animation model in accordance with the commands or subset of signals corresponding to the animated video to be displayed. Thus, as can be seen, a bus 52 containing animation video control commands is applied both to the animation demodulation and display drive 50, and also to an animated video transmission unit 54 which is coupled to the network via bus 56, and more specifically constitutes the animated video channel 42. These animated video control signals are designated as $AV_1$. Simultaneously, the audio channel incorporates an audio bus 60 which may include either digitized audio or analog audio, but which nonetheless is applied to the audio transmission unit 62 which is likewise coupled via bus 64 to the audio channel 40 of the network. The audio transmission unit 62 is also coupled via bus 66 to the animation demodulation and drive unit 50, with this unit not only driving the video component of the meeting, but also the audio as will be described. It will be appreciated that unit 50 is coupled to terminal 30 via an all purpose audio-video bus 68. In this case, the audio from User Station #1 is designated $S_1$.

What will be seen is that audio from User Stations #2 and #3 are coupled via bus 64 through audio transmission unit 62 to animation demodulation and display drive 50 over bus 66; whereas animated video command signals from User Station #2 and #3 are applied through animation transmission unit 54 over a bus 70 to animation demodulation and display drive unit 50.

While the Subject System will be described in terms of a distributed system, it will be appreciated that a centralized system could likewise be utilized.

Figure 2:
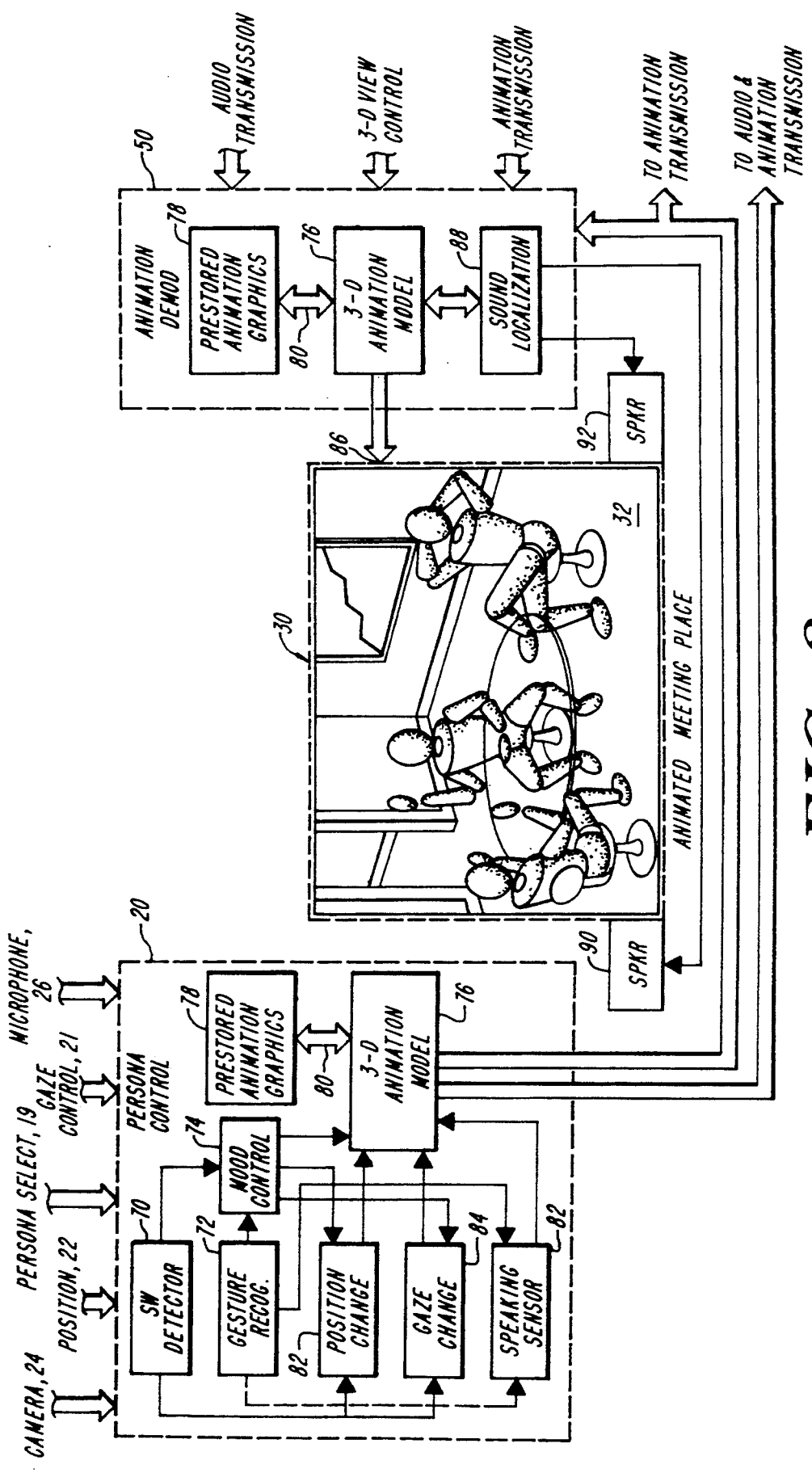
FIG. 2 is a diagrammatic illustration of the Persona control and Animation Demodulation and Display Drive units of the system of FIG. 1.

Referring now to FIG. 2, as can be seen, terminal 30 with scene 32 thereon is depicted along with Persona control unit 20 and animation demodulation and display drive 50 being expanded to indicate the desired functions.

Referring to the Persona control unit of the animated electronic meeting place in FIG. 2, Persona control unit 20 includes a switch detector 70 and a gesture recognition unit 72 which are coupled to a mood control unit 74 that in turn controls 3-D animation model 76. It will be appreciated that there are prestored images and graphics loaded in to form a data base 78 coupled to 3-D animation model 76 via bus 80. Data base 78 provides the on-site storage of the characters that are to be portrayed on screen.

The animated model is driven not only with the mood control but also optionally from the position and gaze of a user. A sensor which senses which of the individuals is speaking may also be provided. This is accomplished by coupling sensed position and gaze information to position and gaze change units here illustrated at 82 and 84 respectively, which are coupled to mood control 74 to change the respective positions or gaze of the user in accordance with that which the user wishes to portray to others. Should there be no change of position or gaze which the user wishes to communicate, then the position and gaze change units provide solely a pass-through function.

With respect to providing information as to whether or not a particular user is speaking, this can be done either conventionally through the utilization of modulation detectors within speaking sensor 82, or through the utilization of gesture recognition as illustrated by dotted line 84 in which camera 24 can be utilized via coupling through the gesture recognition system to recognize moving lips. This has particular utility when, extraneous noise in the scene indicates that a user is speaking when in fact the user is not speaking.

As to gesture recognition, it is possible to provide this through the utilization of a processing unit driven by the video camera such that various gestures can be recognized and the animated character made to perform the particular gesture. Such a system is described in a co-pending patent application by William T. Freeman entitled Dynamic and Static Hand Gesture Recognition Through Low-Level Image Analysis, Ser. No. 08/099,944. Additionally, each of the animated characters can be driven by conventional 3-D model software such as Soft Image and Alias, which are commercially available. Additionally, position of an individual can be determined either through very accurate means fixed to a wall or a desk which actually physically senses the motions of the individual. Secondly, data gloves or a data jacket may be utilized to detect the individual's position. Thirdly, inductive non-tactile means can be utilized to detect the individual's position. Optical sensors can also be used to sense various reflective dots placed on the individual. Cameras can be utilized for sensing individual movement, although these types of optical recognition systems are presently too slow to give the animated characters movement in sufficient real time to be satisfactory.

Animation demodulator and drive unit 50 is illustrated to the right of terminal 30 to include either the same prestored animation graphics data base 78 as described above, or some modified animation graphics data base. This prestored graphics data base is utilized by the same type 3-D animation model 76 as illustrated to the left. Alternatively this animation model may be differently configured. Here the prestored graphics data base is coupled to the animation module again by bus 80 or some other bus. The output of the 3-D animation module is applied via bus 86 to terminal 30, and should 3-D sound localization be required, a sound localization unit 88 detects whatever localization information is available from sending station. Upon detection of localization information unit 88 stereoscopically moves or steers the sound around the scene, such that speakers 90 and 92 convey the sound localization. Sound localization can be made to correspond to the speaking participant and be placed so that the sound appears to come from the corresponding character in the scene. Alternatively, sound can also be localized by the animated position on the screen, but not the position of the speaker. The localization can be done, not necessarily, sensing the source of the voice.

As illustrated, both audio and animated video control or command signals from remote sources are coupled to the animation demodulation unit such that the participants at remote sites can be appropriately located in scene 32. It will also be appreciated that 3-D view control 34 is coupled to this unit so that the individual at his particular user station can maneuver his way through the 3-D image via the utilization of a joy stick.

It is an important feature of the Subject System that the individual can see himself in the scene or not at his option through the utilization of the 3-D view control which can remove him from the scene if desired. It is however an important feature of the Subject Invention that the individual be able to view himself so as to be able to determine how he is portrayed. This permits him to alter his appearance to the others within the electronic meeting place.

Of equal importance is the idea that an individual, whether within an animated electronic meeting place or not, can control that persona or character transmitted to others. Unlike full frame video in which the user has no control over that of himself which is presented, in the Subject Invention the user has control over the animated character transmitted, such that the user need not be fearful that inadvertent gestures will be portrayed to others. Thus, whether or not it is a single path transmission of the user to a remote terminal, or a multi-user system involving a network, it is a feature of the Subject Invention that a character representing the sending individual be utilized to represent himself and further that the sending individual have complete control over how that character is represented to others.

Figure 3:
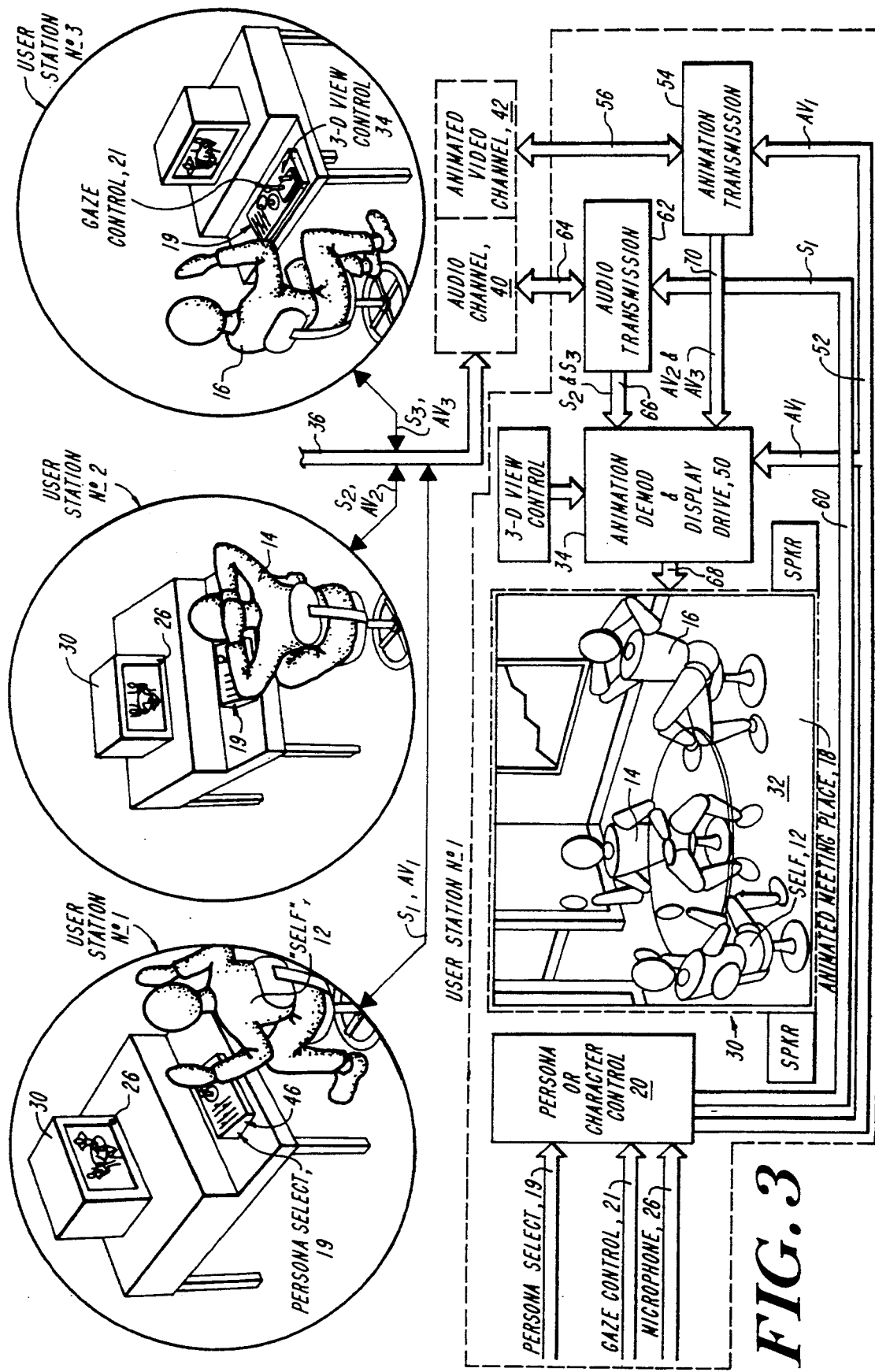
FIG. 3 is a diagrammatic illustration of the system of FIG. 1 in which position and gesture sensing is removed from a user station, leaving manual switches and a joy stick for the user to control his character in the meeting.

Referring now to FIG. 3, a preferred version of the animated electronic meeting place deletes from the system all means of detecting an individual's position eg., by the use of cameras, data glove, data jackets or any means to detect the individual's position. This means that the individual has complete control of the way that he is presented in caricature to the meeting place regardless of his position at the terminal or even whether or not he is present at the terminal.

As can be seen, camera 24 as well as position detector inputs have been deleted from Persona or Character control unit 20, such that the individual can participate in the meeting without other participants knowing exactly what the person is doing as he views the meeting. The Persona control unit is designed to provide control over the position of the character in the scene as well as his gesturing and gaze.

Moreover, since the position of the person within the meeting is not predetermined, the individual has control over where in the scene he is situated. Thus, if an individual decides that he wants to be seated "at the head of the table", then he can attempt to place himself there, as he would in a naturally occurring meeting. Should there be those wishing to occupy the same space in the meeting, then this is resolved in a typical conflict resolution manner as is typical when participants come into a meeting room.

In short, this simplified animated electronic meeting place does not require position sensors of any kind or in fact cameras to ascertain the position of the individual. Of course, cameras can be utilized to ascertain what gestures the individual wishes to portray, although this can be controlled by a joy stick or other control provided to the user at the user's station.

In the above preferred system the user may be completely opaque to the meeting place meaning because his actual position and gestures can be masked or altered by virtue of there being no sensory input with respect to his presence at his particular computer terminal. This has the obvious advantage that unwanted gestures and positioning is eliminated vis-a-vis the scene presented to the participants. Moreover, the individual has the ability to place himself within the scene where he wants, subject to assent by the other participants.

Alternatively, there can be a preset scene in which by prearrangement the individuals are seated in a predetermined spatial relationship around a conference table. The conflict resolution for the predetermined placement must obviously take place prior to the scheduling of the meeting.

Having above indicated a preferred embodiment of the present invention, it will occur to those skilled in the art that modifications and alternatives can be practiced within the spirit of the invention. It is accordingly intended to define the scope of the invention only as indicated in the following claims.

What is claimed is:

1. An animated electronic meeting place in which characters representing participants are depicted in a scene, comprising:
   means at a first location for transmitting audio signals corresponding to speech of a participant and animation graphic control signals corresponding to the position and motion that the character corresponding to said participant is to possess in said scene; and,
   means at a second location and responsive to said signals for reproducing said speech and for generating said scene with each of said participants therein in animated form as a character driven by said animation graphic control signals.

2. The animated electronic meeting place of claim 1, and further including means at said first location for reproducing at least a part of said scene.

3. The animated electronic meeting place of claim 2, wherein said scene at said first location includes the character corresponding to the participant thereat so that said participant can view himself as he participates in the meeting.

4. The animated electronic meeting place of claim 1, wherein said means for transmitting said animation graphic control signals includes means for controlling the persona represented thereby such that said participant can control how he is represented by his character in said scene.

5. The animated electronic meeting place of claim 4, wherein said persona control means includes means for altering said animation graphic control signals such that the corresponding character in said scene conveys a mood controlled by said participant.

6. The animated electronic meeting place of claim 4, wherein said persona control means includes means for recognizing gestures of said participant and for altering said animation graphic control signals responsive thereto, such that the character corresponding to said participant is shown with corresponding gestures.

7. The animated electronic meeting place of claim 4, wherein said means for recognizing gestures includes means for recognizing a gesture representing a predetermined mood and wherein said animated graphic control signal altering means includes means for altering said signals such that the character representing said participant exhibits said predetermined mood.

8. The animated electronic meeting place of claim 1, wherein said means for generating said scene includes means for steering the apparent direction of the reproduced speech to the location of a speaking character.

9. The animated electronic meeting place of claim 1, wherein said means for generating said scene includes means for prestoring animation images and graphics as a data base, and an animation model coupled to said data base for generating the animated characters in said scene, thereby to preclude the necessity of transmitting full frame bandwidth intensive video from said first location to said second location.

10. The animated electronic meeting place of claim 9, wherein said animation model is a 3-D model for generating a 3-D scene.

11. The animated electronic meeting place of claim 10, and further including means at said second location for altering the perspective of said 3-D scene to permit viewing said scene at differing vantage points.

12. The animated electronic meeting place of claim 10, and further including means for zooming in and out of said 3-D scene.

13. The animated electronic meeting place of claim 1, and further including means at said first location for detecting the position and orientation of at least a portion of said participant and for altering said animation graphic control signals responsive thereto, such that the character corresponding to said participant is like positioned and oriented.

14. The animated electronic meeting place of claim 1, wherein said means for transmitting said animation graphic control signals includes means for controlling the position in said scene of the character corresponding to said participant.

15. The animated electronic meeting place of claim 1, wherein said means for transmitting said animated graphic control signal includes means for controlling the gaze of the character corresponding to said participant.

* * * * *